United States Patent
Springhetti et al.

(10) Patent No.: US 12,045,784 B2
(45) Date of Patent: Jul. 23, 2024

(54) AGGREGATION AND PROCESSING OF CHECK-BASED PAYMENTS

(71) Applicant: Deluxe Corporation, Shoreview, MN (US)

(72) Inventors: Rodney Pete Springhetti, Huntersville, NC (US); Lawrence Francis Buettner, Inverness, IL (US); Samuel William Golbach, Rothschild, WI (US); Christopher Wade Clausen, Andover, MN (US)

(73) Assignee: Deluxe Corporation, Shoreview, MN (US)

( * ) Notice: Subject to any disclaimer, the term of this patent is extended or adjusted under 35 U.S.C. 154(b) by 0 days.

(21) Appl. No.: 18/049,071

(22) Filed: Oct. 24, 2022

(65) Prior Publication Data
US 2023/0066909 A1 Mar. 2, 2023

Related U.S. Application Data

(62) Division of application No. 16/842,998, filed on Apr. 8, 2020, now abandoned.
(Continued)

(51) Int. Cl.
*G06Q 20/04* (2012.01)
*G06F 9/54* (2006.01)
(Continued)

(52) U.S. Cl.
CPC .......... *G06Q 20/0425* (2013.01); *G06F 9/54* (2013.01); *G06F 16/2379* (2019.01);
(Continued)

(58) Field of Classification Search
CPC .......... G06Q 20/0425; G06Q 20/4016; G06Q 10/10; G06F 16/17; G06F 16/2379; G06F 9/54
See application file for complete search history.

(56) References Cited

U.S. PATENT DOCUMENTS

7,512,564 B1 3/2009 Geer
7,809,616 B1 10/2010 Orttung et al.
(Continued)

FOREIGN PATENT DOCUMENTS

AU 2002233050 B2 9/2019

OTHER PUBLICATIONS

Adewole et al., "A Conceptual Design of Electronic Bill Presentment and Payment System", Proceedings of the Second Conference on Science and National Development, Oct. 10-13, 2006.

*Primary Examiner* — Scott C Anderson
(74) *Attorney, Agent, or Firm* — Stinson LLP

(57) ABSTRACT

The present subject matter involves a system and method for producing and processing electronic transactions, including electronic checks, in a secure manner. In various embodiments, a secure server provides an electronic check service that maps payees to participating lockbox service providers and provides electronic payment instructions from the payor to the lockbox service providers to process payments to the payees. In various embodiments, a check is printed to fulfill Check21 Act requirements, electronic images are obtained of front and back of the printed check, and check image pairs are created of the electronic images of the front and back of the printed check. In various embodiments, paper items are processed where the electronic check service does not find an electronic deposit match. In various embodiments, the electronic lockbox files are used in a secure electronic payment platform that assists in the generation of electronic checks.

7 Claims, 6 Drawing Sheets

Related U.S. Application Data

(60) Provisional application No. 62/830,686, filed on Apr. 8, 2019.

(51) Int. Cl.

| | | |
|---|---|---|
| *G06F 16/23* | (2019.01) | |
| *G06F 16/27* | (2019.01) | |
| *G06Q 10/10* | (2023.01) | |
| *G06Q 20/40* | (2012.01) | |
| *G06Q 30/04* | (2012.01) | |
| *G06Q 40/02* | (2023.01) | |
| *G06Q 50/26* | (2012.01) | |

(52) U.S. Cl.
CPC ............ *G06F 16/27* (2019.01); *G06Q 10/10* (2013.01); *G06Q 20/4016* (2013.01); *G06Q 30/04* (2013.01); *G06Q 40/02* (2013.01); *G06Q 50/26* (2013.01); *G06Q 2220/00* (2013.01)

(56) References Cited

U.S. PATENT DOCUMENTS

| | | | |
|---|---|---|---|
| 9,779,392 | B1 | 10/2017 | Prasad et al. |
| 10,586,019 | B1* | 3/2020 | Dowling .............. G06Q 20/145 |
| 10,833,843 | B1 | 11/2020 | Vijayvergia et al. |
| 2007/0271160 | A1 | 11/2007 | Stone et al. |
| 2008/0249931 | A1* | 10/2008 | Gilder .................... G06Q 20/04 |
| | | | 705/39 |
| 2009/0212104 | A1* | 8/2009 | Smith ....................... G07F 7/04 |
| | | | 235/379 |
| 2013/0138563 | A1 | 5/2013 | Gilder et al. |
| 2014/0099001 | A1 | 4/2014 | Nepomniachtchi et al. |
| 2014/0279310 | A1 | 9/2014 | Fossella et al. |
| 2016/0048813 | A1* | 2/2016 | Mauller .................. G06Q 40/12 |
| | | | 705/30 |
| 2016/0071069 | A1 | 3/2016 | Skala |
| 2016/0277411 | A1 | 9/2016 | Dani et al. |
| 2018/0144292 | A1* | 5/2018 | Mattingly ............. G06F 16/903 |
| 2018/0267847 | A1 | 9/2018 | Smith et al. |

\* cited by examiner

AGGREGATION AND PROCESSING OF CHECK-BASED PAYMENTS

CLAIM OF PRIORITY AND INCORPORATION BY REFERENCE

The present application is a divisional of U.S. patent application Ser. No. 16/842,998, filed Apr. 8, 2020, which claims the benefit under 35 U.S.C. § 119(e) of U.S. Provisional Patent Application 62/830,686, filed Apr. 8, 2019, which are hereby incorporated by reference herein in their entirety.

TECHNICAL FIELD

This application relates generally to electronic financial transaction processing, and more particularly to the secure processing of electronic remittance payments, that is a payment from a Buyer (Payor) to a Seller (Payee or Biller).

BACKGROUND

A monetary transaction typically involves a payor providing funds to a payee for goods or services rendered in response to a bill or invoice. One common way for a payor to provide funds to a payee is in the form of a negotiable instrument, such as a check. A check is a negotiable instrument drawn against the payor's financial institution which includes the financial institution's bank routing number, payor's account number, payment amount, payee's name, date, and payor's endorsement. The payee can cash the check at a bank or other financial institution, deposit the check into the payee's account, or endorse it for payment to the order of another person or legal entity. The bank uses the information provided on the check to determine the amount of the check, a bank and account where the funds are located, and sometimes the payee account in which to deposit the funds.

This system of transferring funds between a payor and a payee using a physical document, such as a check, presents several challenges. First, most payors are making several payments in a payment cycle and payors must make sure that the payor information is up to date and accurate. Second, payee information may vary over the course of a year, making it challenging to remit payment to the proper payee destination. Third, different payees have different modes of accepting payments, each of which must be accommodated. Fourth, the records of the payments may have to be provided to update accounting software so that the payments are logged as having been made. Fifth, the payee needs to know if the amount of the payment is what was expected as reflected on the bill or invoice. Other challenges exist, and the foregoing list is provided to demonstrate some of the challenges.

In addition, the check clearing system based on the exchange of physical documents can be costly and add time delays to the check clearing process due to transportation and processing of large volumes of physical documents. In the United States of America, prior to 2004 if a payee deposited a check written by a payor from one bank into an account at a different bank, the banks would have to physically exchange the paper check before the money would be credited to the account. In 2004 the Check Clearing for the 21st Century Act (Check21 Act) was passed in the United States which makes the digital image of a check (electronic check or eCheck) legally acceptable for payment purposes in the same manner as a traditional paper check. Under the Check21 Act, rather than exchanging paper checks between banks when a payee deposits a check, one bank can send an image of the check to the other bank. Similarly, the physical presentment of a paper check and paper invoice or bill to a payee can be costly and add time delays due to transportation of large volumes of physical documents. Additionally, the conversion of the information found on physical document (e.g. checks, bills, invoices) can be costly and add time delays due to the process and accuracy of the conversion process (e.g. use manual data entry to enter information from the document into a computer and/or scan documents into a computer and use Optical Character Recognition (OCR) algorithms to recognize and interpret information from the document.

Thus, there is a need in the art for a trusted electronic payment platform to process electronic payments, including electronic checks, in a secure manner.

SUMMARY

The present subject matter involves a system and method for producing and processing electronic payments and remittance information including electronic checks in a secure manner.

In various embodiments, enrollment information is received from payors and payees, including authorization to process electronic payments or deposits to select payees. A secure portal is provided to authenticate electronic payment instructions from the payor, in various embodiments. In various embodiments, electronic payment instructions are received including payment data from the payor via the secure portal, the payment data including an amount of a payment and identifying at least one payee. In various payments, the payment is made using an electronic check (eCheck) electronically sent to a lockbox at a participating bank for the payment to the payee. In various embodiments, a check is printed to fulfill Check21 Act requirements, electronic images are obtained of front and back of the printed check, and an electronic deposit is performed in the amount of the payment to the payee using an electronic lockbox system of a banking partner. In various embodiments, a bill or invoice is printed that accompanies the check or eCheck. In cases where electronic payments are not recognized for a payee, paper items can be sent.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Figure 1:
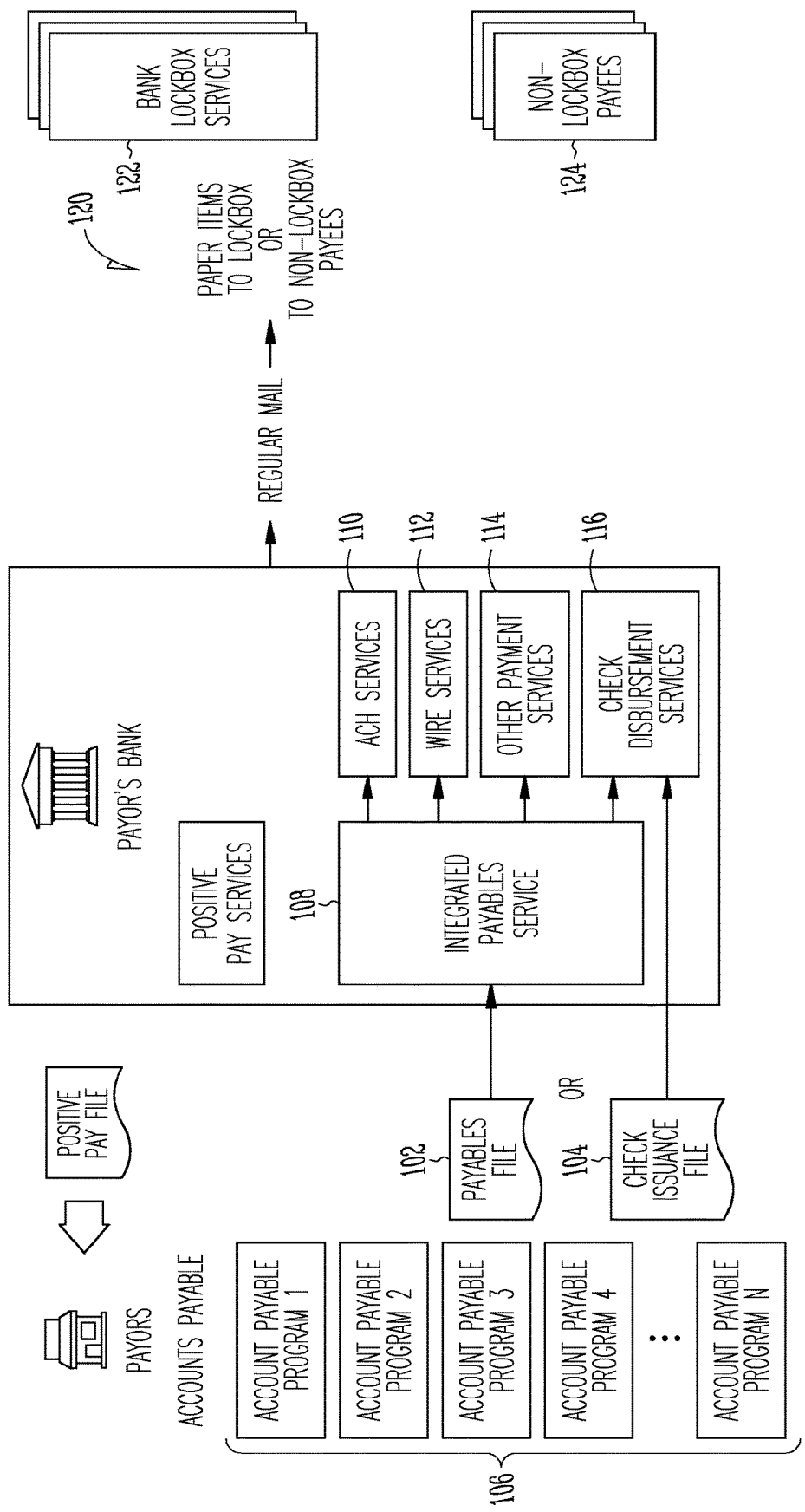
FIG. 1 is a flow diagram demonstrating traditional payment flows of a bank with the payor as a client.

Payments by companies in response to bills and/or invoices are frequently accomplished using ERP (enterprise resource planning) software or accounting software that manages and integrates a company's financial records and activities, among other things. Such systems frequently employ payable files from various databases to perform batch payments. Companies often employ a check issuance file which can be used by a payor to disburse checks. FIG. 1 is a flow diagram 100 demonstrating traditional payment flows of a bank with the payor as a client. The payors can formulate payable files 102 and check issuance files 104 from a variety of financial software. Various account payable programs 106 can be used to create check disbursements from the payor's bank. Some programs 106 include, but are not limited to those by SAP, Oracle, Excel, Microsoft and QuickBooks. Payable files 102 and check issuance files 104 are processed by integrated payable services 108 such as ACH services 110, wire services 112, and other payment 114 and check disbursement services 116. The resulting paper checks and corresponding bills and/or invoices (if available) are combined (120) and mailed to payee bank lockbox services 122 and directly to non-lockbox payees 124.

A lockbox is a collection and processing service companies use to collect payments from a dedicated postal box to which the company directs its customers to remit payment to. The company or its lockbox service provider, which may be a bank or other service provider, makes several collections each day and deposits the collected funds in the company's bank accounts.

The present subject matter provides systems and methods for aggregation and electronic processing of check-based payments. In various embodiments, the present subject matter provides a way to network with banks and other financial institutions to reduce the cost of operations to lockbox clients. In various embodiments, the service replaces paper checks with electronic import to a bank's lockbox.

Figure 2:
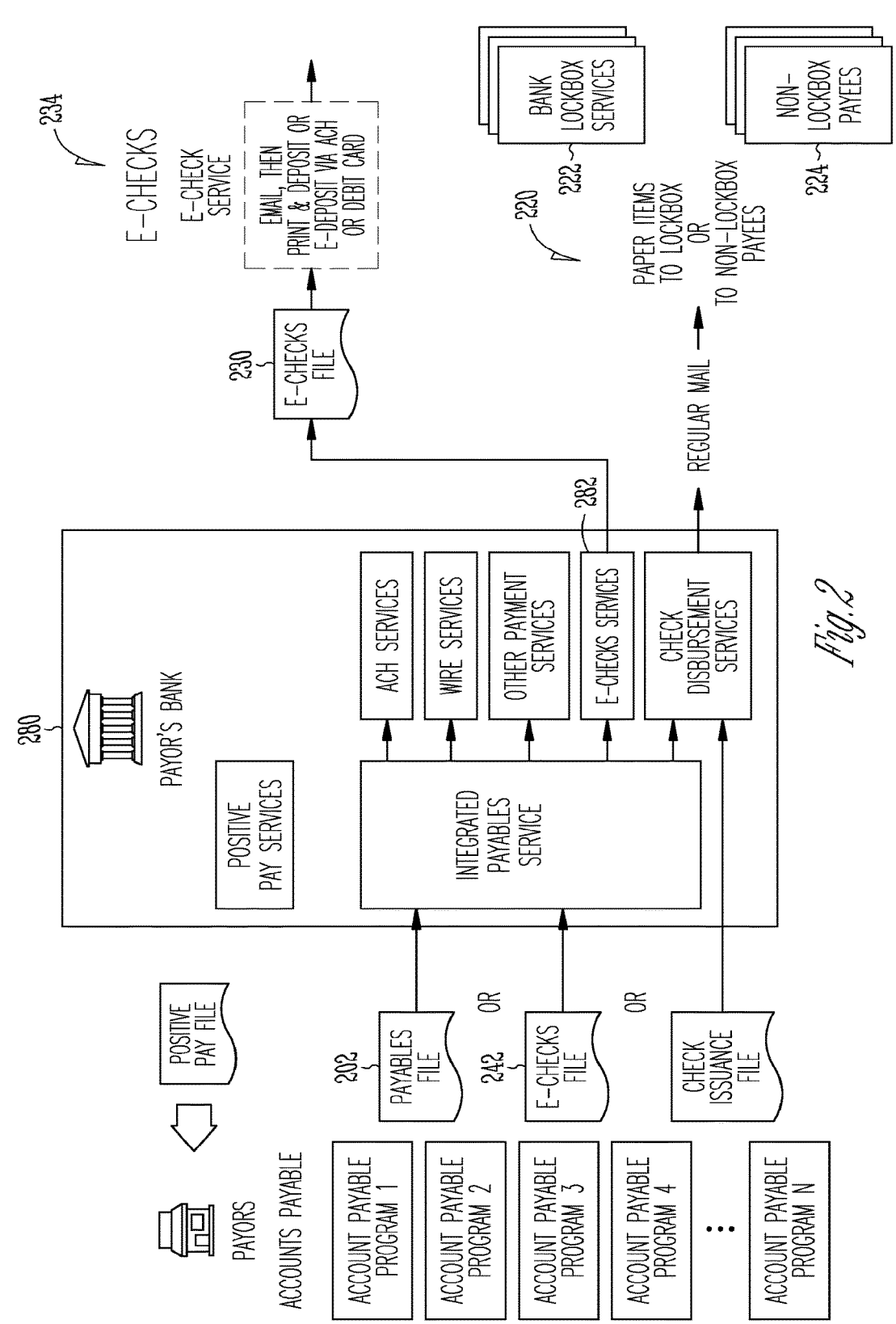
FIG. 2 is a flow diagram demonstrating payment flows of a bank with the payor as a client using a lockbox and electronic checks (eChecks) according to one embodiment of the present subject matter.

FIG. 2 is a flow diagram 200 demonstrating payment flows of a bank with the payor as a client using a lockbox and electronic checks (eChecks) according to one embodiment of the present subject matter. The system adds an eCheck file 230 for eCheck payments electronically produced by an eCheck Service 282 of the payor's bank 280. This allows eChecks 234 to be produced, scanned, and electronically deposited (such as by electronic deposits vial ACH or by a debit card), as from a payables file 202 and eChecks file 242 instructions as opposed to check drafts that are printed and mailed. The system also allows for paper items 220 to be sent to the payee bank's lockbox 222, or to be directly mailed to non-lockbox payees 224.

Figure 3A:
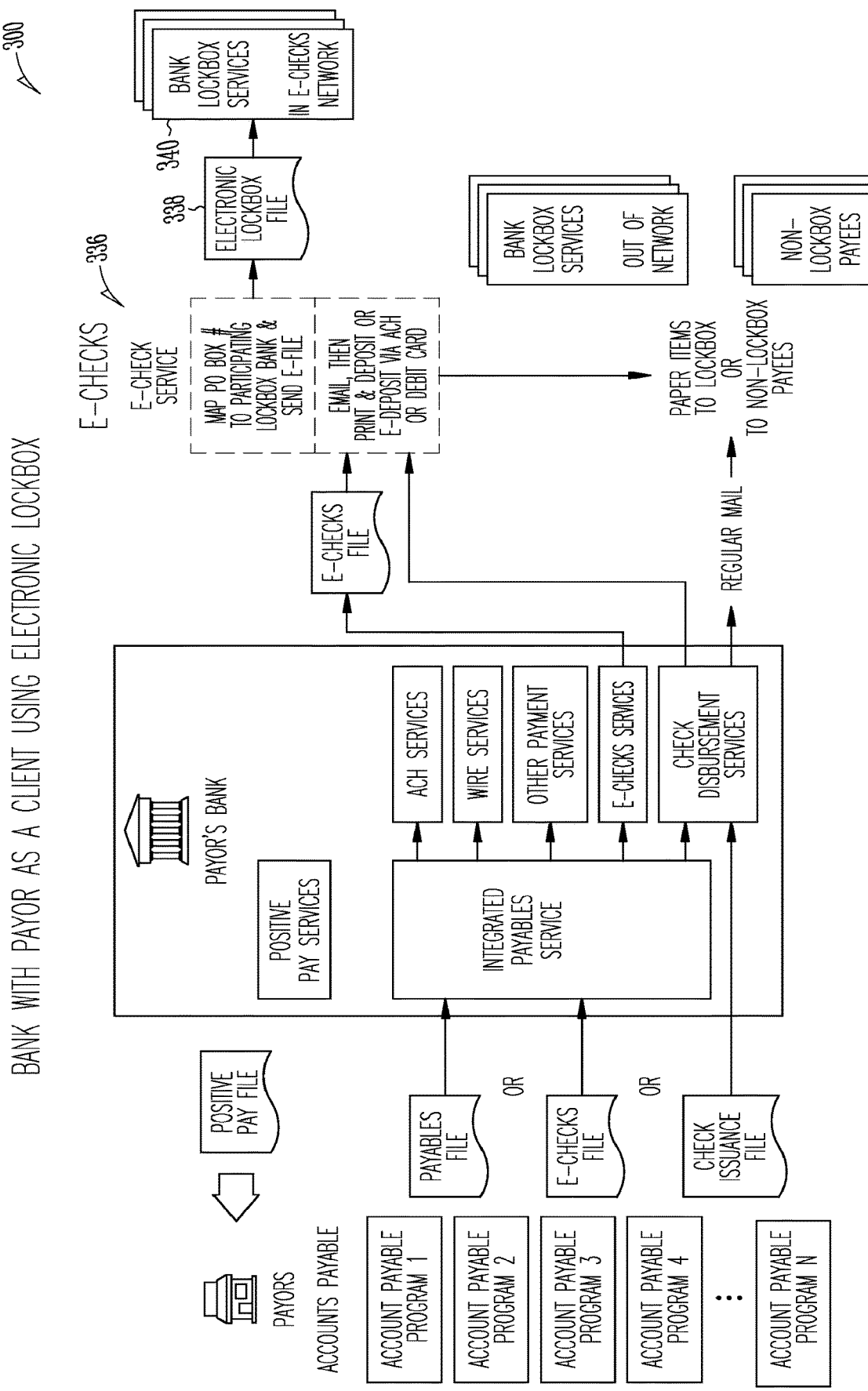
FIG. 3A is a flow diagram demonstrating payment flows of a bank with the payor as a client using an electronic lockbox and eChecks according to one embodiment of the present subject matter.
Figure 3B:
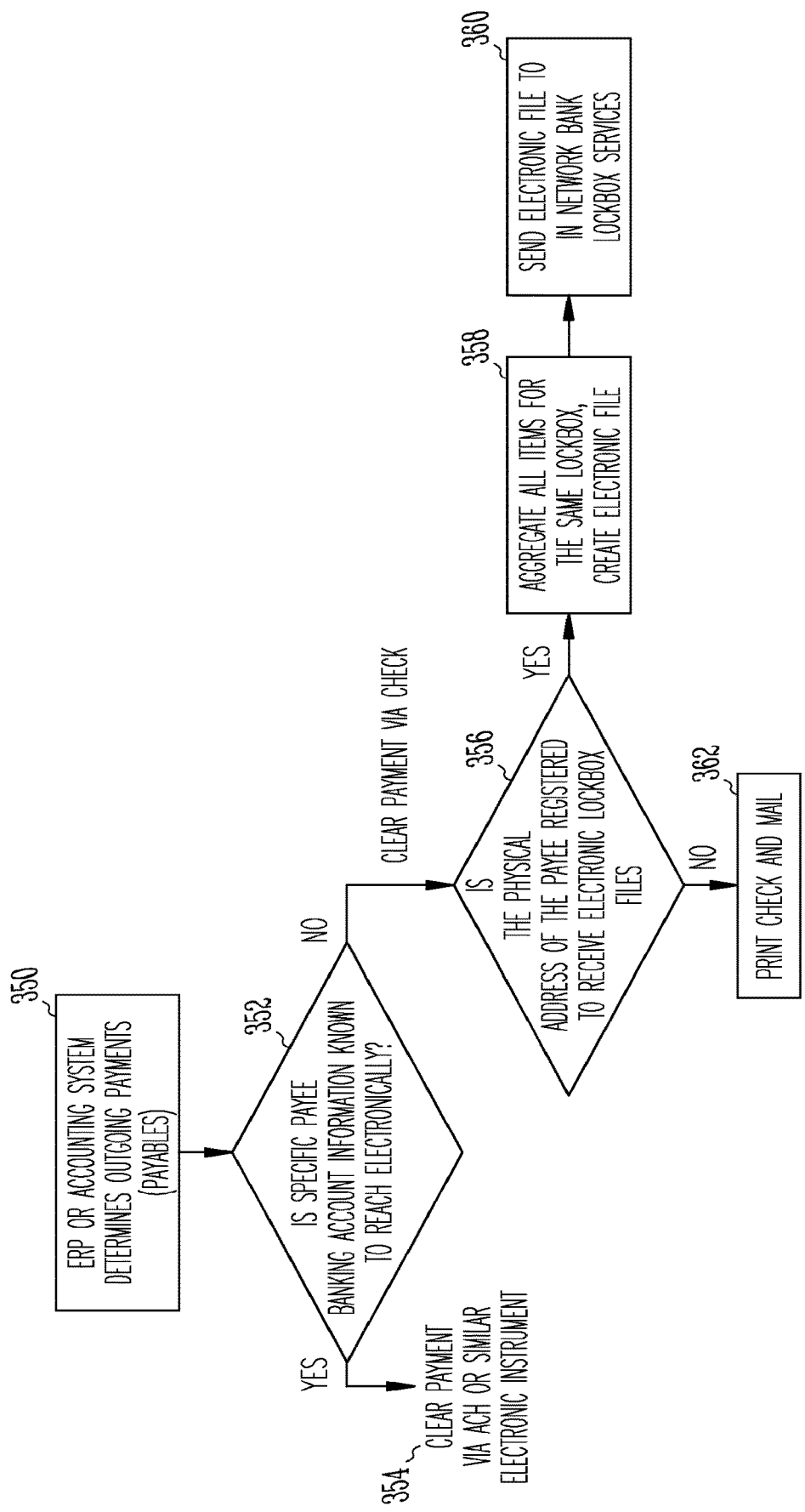
FIG. 3B is a flow diagram showing the selection of payment modes based on recorded information about the payee according to one embodiment of the present subject matter.

In various embodiments, participant banks will send the eCheck Service disbursement files of check and invoice details to be printed and mailed. FIG. 3A is a flow diagram 300 demonstrating payment flows of a bank with the payor as a client using eChecks and an electronic lockbox according to one embodiment of the present subject matter. As shown in FIG. 3B, the payor's ERP or accounting system will determine outgoing payments (payables) at 350. The payor's bank will determine if the specific payee banking account information is known to reach the payee electronically, at 352. If so, then the payment can be cleared via ACH or some other electronic payment instrument, at 354. If not, the eCheck Service will determine if check and invoice details are destined for a payee P.O. Box address of a payee that is registered to receive electronic lockbox files, at 356. An electronic lockbox file is a lockbox file that is converted to an electronic version. If the payee is registered to receive such files, then the lockbox processing is outsourced to one of the participant banks or not (e.g., resulting in a match or no match). If there is a match, then the check will be printed, imaged, discarded (to meet current industry requirements), bundled with invoice details, aggregated with other items at 358 and sent to participant bank in an electronic file at 360. The electronic file is received by a network bank lockbox service. If there is no match, the checks and invoice details will be printed and mailed at 362. The lockbox platform (e.g., IRPS or Image Remittance Processing System) will be enhanced to ingest the electronic file and process through the lockbox system consistent with paper presentment.

In various embodiments, the eCheck Service 336 includes storage or other dynamic service (e.g., an application programming interface (API)) that can map a P.O. Box number to a participating lockbox bank or other lockbox service provider and provide an electronic lockbox file 338 for payee lockbox services to process checks for payees in the eCheck Service network 340. One benefit of this electronic lockbox file is that it may include specific and accurate information from both bill or invoice and the check saving the need for downstream reconcilement. In various embodiments, tracking individual check items, individual bill items, individual invoice items and files could deploy blockchain or distributed general ledger approaches to ensure payments are not lost, payors are known and accurate and payees are known and accurate. In various embodiments, given the potential real time flow of transactions from payor to payee, the eCheck Service could act as a platform for payors and payees to negotiate terms of any payment which may result in discounts, credits or other monetary or non-monetary benefit to either party.

Figure 4:
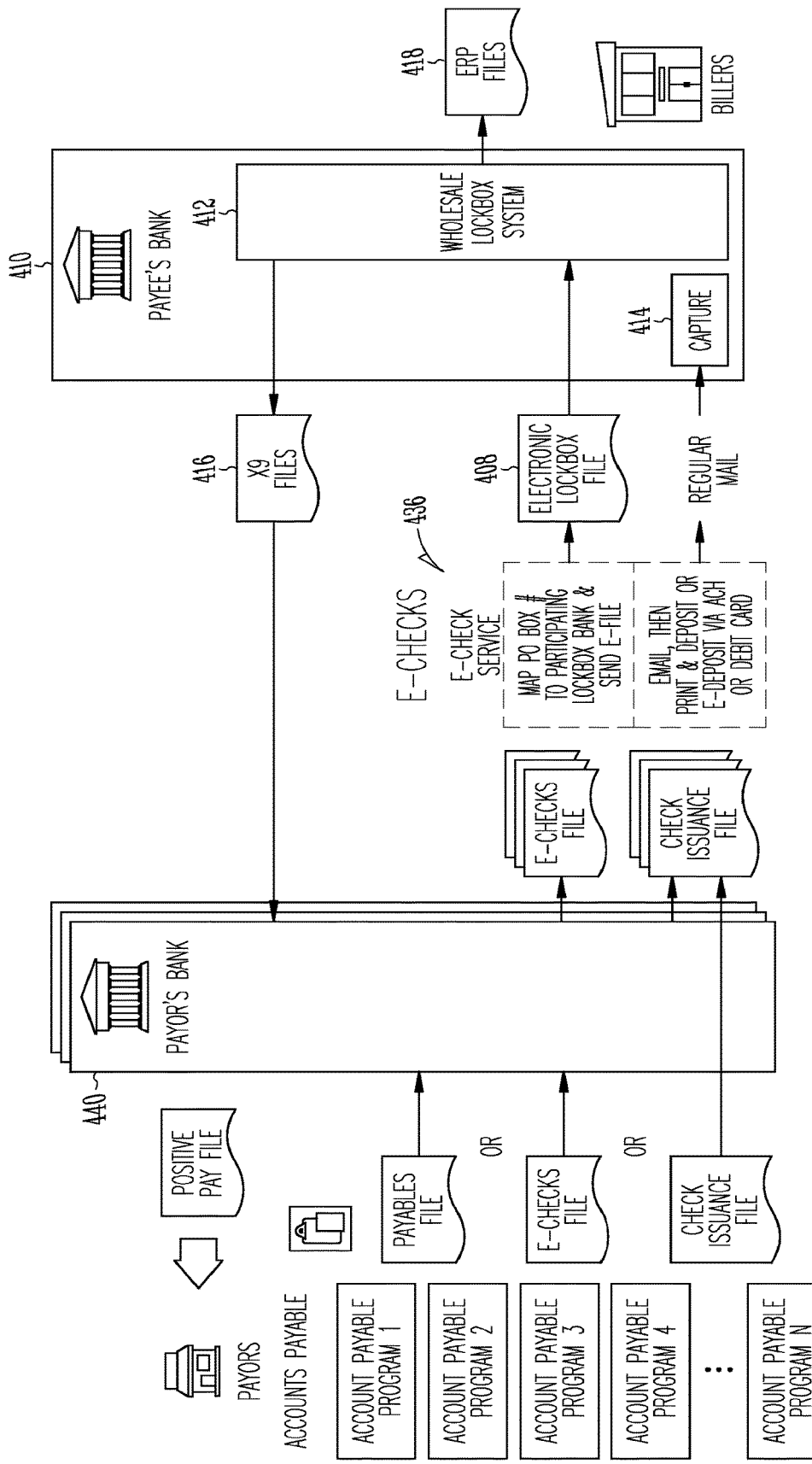
FIG. 4 is a flow diagram demonstrating payment flows of a bank with the payee as a client using an electronic lockbox and eChecks according to one embodiment of the present subject matter.

FIG. 4 is a flow diagram 400 demonstrating payment flows of a bank with the payee as a client using an electronic lockbox and eChecks according to one embodiment of the present subject matter. In various embodiments, the payee's bank 410 receives electronic lockbox files 408 from the payor's eCheck Service 436. The electronic lockbox file 408 is received by a wholesale lockbox system 412 at the payee's bank 410 and paper checks are also captured 414 and recorded by the system. The resulting payments are reported back to the payor's banks 440 via X9 files 416 and are also recorded as ERP files 418 to manage the payment records at the payee. This allows the participant payee banks 410 to utilize an eDeposit box feature to disintermediate eChecks and create an X9 file 416 for payor's bank. The result is an eChecks "clearing house."

In various embodiments, the present subject matter provides reduced upfront costs for completing an A/P (accounts payable) or A/R (accounts receivable) cycle. In various embodiments, the present subject matter provides for aggregation and delivery of bulk check-based payments in real time or near real time. In various embodiments, the electronic lockbox system provides for improved retention of lockbox clients by increasing the value and differentiation of the electronic lockbox system. In various embodiments, the present subject matter provides a payments platform to allow buyers and sellers to negotiate discounts and rebates for different transaction terms. Additional advantages include faster payment, acknowledgement of receipt, inclusion of remittance details, fewer posting exceptions, and improved cash management for payors and payees.

In various embodiments the payors and payees are logged into the payment system using a client device, such as a desktop computer, a mobile phone, a laptop computer, or other computing device. In various embodiments the client executes a browser-based program or API interface to communicate with the payment system. In various embodiments, the client executes an applet or other software to communicate with the payment platform.

The present subject matter can be practiced in electronic payment systems, such as in the Trusted Secure Electronic Payment Processing Platform described in U.S. Provisional Patent Application Ser. No. 62/742,047, filed on Oct. 5, 2018, which is hereby incorporated by reference in its entirety. In various embodiments, the front and back side of the check are printed using the platform to provide a paper check, which can be used to document an electronic transfer and which can be scanned and presented using the Check21 process. In such embodiments, the payor can provide payee and an amount of the payment to the secure electronic payment platform. The secure electronic payment platform can composite front and back sides of a check that can be remitted for payment using the Check 21 infrastructure in cooperation with its financial institution partners to provide payment to the payee.

In various embodiments, a printed check is imaged (such as by scanning) using the secure electronic payment platform in a format suitable for Check 21 processing. In various embodiments, the secure electronic payment platform formulates payment instructions to banks (or other financial institutions) using the Check 21 infrastructure, and completes payments and collects funds for payments.

According to various embodiments, the payor registers with the secure electronic payment platform, and authorizes it to process electronic payments and/or deposits on behalf of the payor to select payees. The payor sends electronic transaction data, such as is found on check front, using a graphic user interface (GUI) to the secure electronic payment platform. In various embodiments, the transmission is sent without sending an image of a check. A virtual private network (VPN) is used to transmit account related information, in various embodiments. In various embodiments, the information includes an amount of payment and payee or payee's account. In various embodiments, the funding source for the payment is a default source. In various embodiments, the funding source is designated and provided with the other information. In various embodiments, secure electronic payment platform is configured to receive the electronic payment information and generate a Check 21 compliant eCheck for payment of the payor.

In various embodiments, the secure electronic payment platform is configured to use a server to enroll payors and payees and to collect and record their preferences and authorizations. Payors can be provided a secure access to a database of payees and can request that certain payees are added to the system. The operator of the secure electronic payment platform has storage and secure database features that can assist in the enrollment of new payees, record their payment preferences, and obtain the necessary agreements to deposit electronic payments according to those preferences. Payees can authorize the secure electronic payment platform to endorse payments from the payor as the payee has elected, thereby allowing it to create images of a front and back electronic check for further processing as set forth in this application and as set forth in U.S. Provisional Patent Application Ser. No. 62/742,047, filed on Oct. 5, 2018, which is incorporated by reference in its entirety in this application.

The present subject matter deployed in the secure electronic payment platform includes various advantages for various embodiments, including one or combinations of the following advantages. One of the advantages of the use of a secure electronic payment platform is that it can authenticate payors to prevent fraud. Another advantage of the present subject matter is that the trusted processing platform may use the Check21 infrastructure to pay payees. Other advantages exist which are not described herein.

Figure 5:
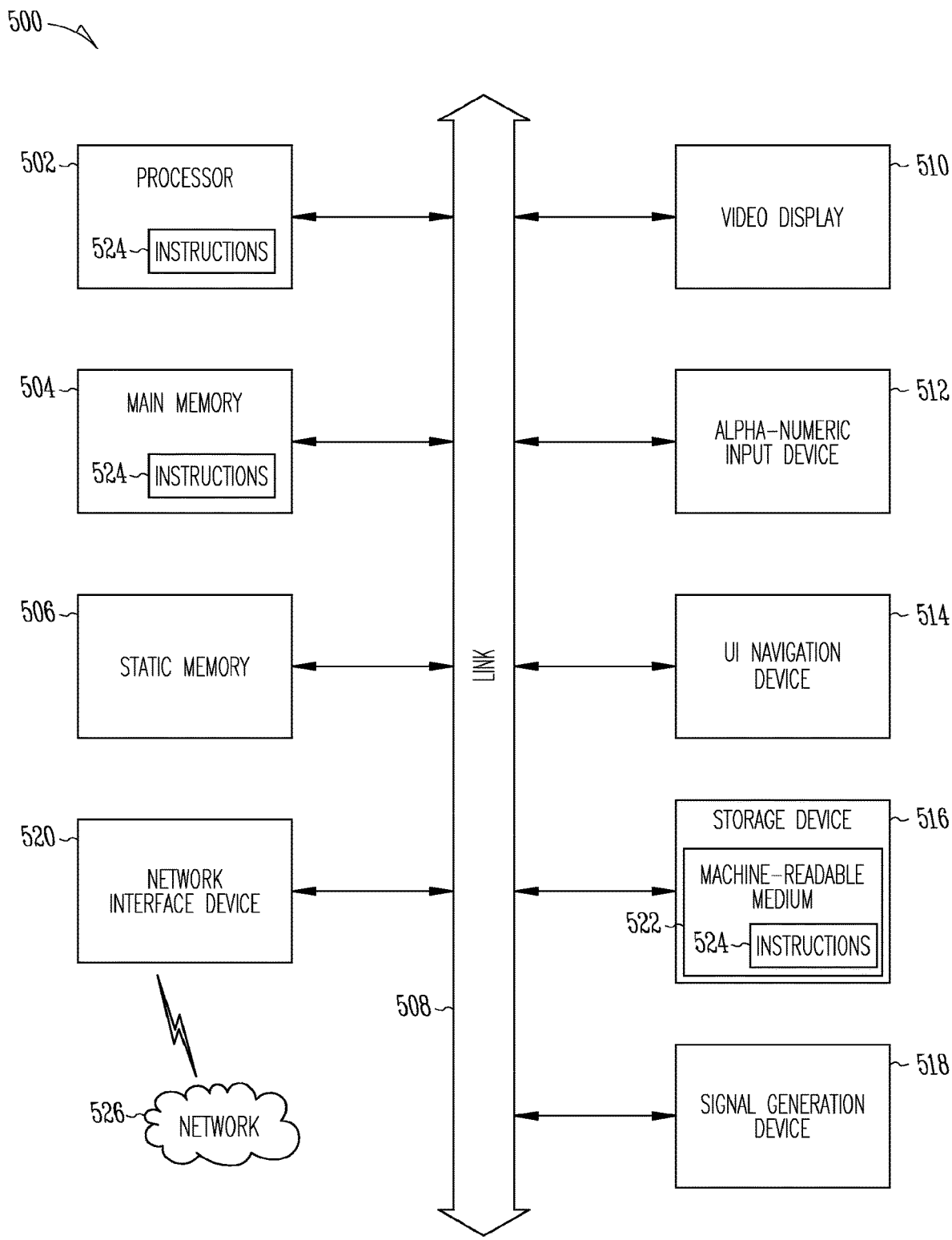
FIG. 5 is a block diagram of a machine in the example form of a computer system within which a set of instructions can be executed, for causing the machine to perform any one or more of the methodologies discussed herein.

FIG. 5 is a block diagram illustrating a machine in the example form of a computer system 500, within which a set or sequence of instructions can be executed to cause the machine to perform any one of the methodologies discussed herein, according to an example embodiment. For example, the computer system 500 could be used at a payor bank to process payment information. The computer system 500 could be used at the eCheck Service to process check payments. The computer system 500 could be used at the payee bank to process check payments. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile or cellular telephone such as a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 can further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 can additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The data storage device 516 includes a machine-readable medium 522 on which is stored one or more sets of data structures and instructions 524 (e.g., software) embodying or utilized by any one or more of the methodologies or functions described herein. The instructions 524 may include a machine learning system or algorithm, and can also reside, completely or at least partially, within the main memory 504, static memory 506, and/or within the processor 502 during execution thereof by the computer system 500, with the main memory 504, static memory 506, and the processor 502 also constituting machine-readable media.

While the non-transitory computer-readable storage medium 522 is illustrated in an example embodiment to be a single medium, the term "machine-readable medium" or "computer-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions (e.g., instructions 524) for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 can further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone system (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

It is understood that other combinations and configurations may be employed without departing from the scope of the present subject matter. This application is intended to cover adaptations or variations of the present subject matter. It is to be understood that the above description is intended to be illustrative, and not restrictive. The scope of the present subject matter should be determined with reference to the appended claims, along with the full scope of equivalents to which such claims are entitled.

What is claimed is:

1. A non-transitory computer-readable storage medium, the computer-readable storage medium including instructions that, when executed by a secure server, cause the secure server to perform operations of:

executing Enterprise Resource Planning (ERP) software, wherein the ERP software is configured to convert bulk check-based payment instructions into electronic check files and paper items instructions for aggregating payments to payees;

executing an electronic check service;

receiving, by the electronic check service, a plurality of electronic check files electronically transmitted from a payor financial institution, wherein the electronic check files are converted from the bulk check-based payment instructions by the executed ERP software;

responsive to receiving the electronic check files from the payor financial institution, authenticating, by the electronic check service, the electronic check files;

executing, by the electronic check service, a dynamic service for mapping one or more payees associated with the check-based payment instructions to one or more participating lockbox service providers;

aggregating, by the electronic check service, the authenticated electronic check files for each of the one or more participating lockbox service providers; and sending, by the electronic check service, an electronic lockbox file to each of the one or more participating lockbox service providers based on the mapping, wherein the electronic lockbox file sent to each of the one or more participating lockbox service providers provides aggregated payments based on the aggregated electronic check files converted from the check-based payment instructions.

2. The non-transitory computer-readable storage medium of claim 1, wherein the computer-readable storage medium further includes instructions that, when executed by the a secure server, cause the secure server to perform operations of:

generating paper payment items from the paper items instructions.

3. The non-transitory computer-readable storage medium of claim 1, wherein the computer-readable storage medium further includes instructions that, when executed by the a secure server, cause the secure server to perform operations of:

receiving X9 files from a payee's bank where electronic lockbox files and paper items are processed.

4. The non-transitory computer-readable storage medium of claim 1, wherein the computer-readable storage medium further includes instructions that, when executed by the a secure server, cause the secure server to perform operations of:

recording the aggregated payments using enterprise resource planning (ERP) files.

5. The non-transitory computer-readable storage medium of claim 1, wherein the computer-readable storage medium further includes instructions that, when executed by the a secure server, cause the secure server to perform operations of:

tracking individual check items using a distributed ledger system.

6. The non-transitory computer-readable storage medium of claim 1, wherein the computer-readable storage medium further includes instructions that, when executed by the secure server, cause the secure server to perform operations of:

responsive to receiving the electronic check files from the payor financial institution, identifying, by the electronic check service, the one or more payees associated with the check-based payment instructions; and retrieving, by the electronic check service, previously recorded authorizations to process electronic payments to select payees.

7. The non-transitory computer-readable storage medium of claim 1, wherein the computer-readable storage medium further includes instructions that, when executed by the secure server, cause the secure server to perform operations of:

authenticating, by the electronic check service, the payor financial institution.

\* \* \* \* \*